United States Patent Office

3,779,965
Patented Dec. 18, 1973

3,779,965
EXTRUDED DISC GASKET FOR ALCOHOLIC BEVERAGE BOTTLE CAPS
John William Lefforge, Lynnfield, Mass., and George Crawford Keller, Derry, N.H., assignors to W. R. Grace & Co., New York, N.Y.
Filed Dec. 17, 1971, Ser. No. 209,168
Int. Cl. C08f 45/52
U.S. Cl. 260—28.5 B          19 Claims

ABSTRACT OF THE DISCLOSURE

A gasket excellently adapted for use in caps for bottles containing beverages of high alcoholic content can be prepared by admixing a molten thermoplastic polymer, a petroleum oil, a completely saturated paraffinic wax or polyethylene wax, a particulate titanium dioxide pigment, and an antioxidant, forming the resulting melt into a sheet having a thickness of about 3–7 mm., cooling said sheet to solidify the melt, chopping the cooled solid sheet into small particles, charging the particles into an extruder, extruding to form a sheet about 0.01–0.03 inch (i.e., ca. 10–30 mils), cutting the sheet into discs, and inserting and seating the discs into caps which have been preheated to about 250° F. Block copolymers having end segments of polystyrene and center segments of polybutadiene or polyisoprene can be used as the thermoplastic polymer for making the gaskets.

BACKGROUND OF THE INVENTION

This invention is in the field of gaskets excellently adapted for use in caps used to cap bottles containing beverages (liquors) having an alcohol (ethanol) content of about 25% by volume or higher. More particularly this invention is directed to a composition excellently adapted for preparing disc gaskets for use in bottle caps, the resulting gaskets being excellently adapted for use in caps intended for capping alcoholic beverages having a high alcohol content (i.e., an alcohol content of at least about 25% by volume). Gaskets prepared from the composition of this invention; (a) do not degrade when such liquor is stored for prolonged periods in bottles capped with caps using said gaskets; (b) do not change the flavor, color, taste, or odor of alcoholic beverages when such beverages (including whiskeys, rums, high proof rums, brandies, and the like) are stored in glass bottles capped with caps using said gaskets for prolonged periods (e.g., periods ranging from a month to several years); and (c) do not produce cloudiness or turbidity in such beverages capped with caps using said gaskets during storage for long periods.

The preparation and installation of gaskets is taught by U.S. Pats. Nos. 3,417,177 (Simons et al., 264/249) and 3,396,698 (Alholm et al., 118/318).

Preparation of gaskets and methods for inserting and seating them in bottle caps and the like are well known to those skilled in the art.

See U.S. patents Nos.:

3,466,731 (Action et al. 113/80);
3,328,873 (Schweers 113/80);
2,964,005 (Weisenburg 113/80);
2,912,042 (Jenkins 113/80).

SUMMARY OF THE INVENTION

In summary this invention is directed to a thermoplastic composition consisting essentially of an intimate mixture of:

(a) 70–90 parts of a block copolymer having a molecular weight of 75,000–120,000 and consisting essentially of 30–60% polystyrene end segments and 70–40% center segments selected from the group consisting of polybutadiene or polyisoprene, the end segments plus center segments totalling 100%;

(b) 3–15 parts of a completely saturated petroleum oil having a density of 0.85–0.88 g. per cc. at 60° F., a viscosity of 25–60 cps., and a naphthenic content of less than 40%;

(c) 6–15 parts of a wax selected from the group consisting of a completely saturated paraffinic wax melting between 105 and 150° F. or a polyethylene wax having a molecular weight of about 1,000 and a melting at about 235° F.; and (d) 1–3 parts of 2,6-ditert-butyl para-cresol.

DESCRIPTION OF PREFERRED EMBODIMENTS

Figure 1:
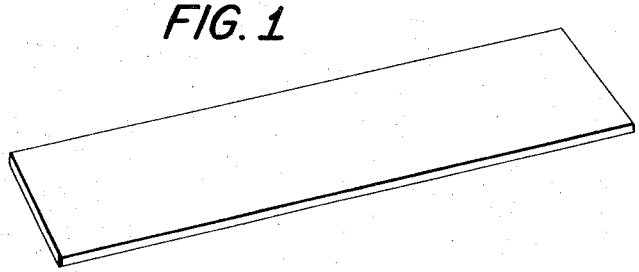
FIG. 1 is a general representation of a sheet of our thermoplastic composition. Such sheets are recited in preferred embodiments (2) and (3).
Figure 2:
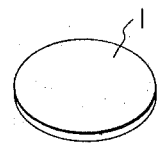
FIG. 2 is a general representation of a gasket cut from a sheet of our thermoplastic composition. Such gaskets are recited in preferred embodiments (6), (7), and (8).
Figure 3:
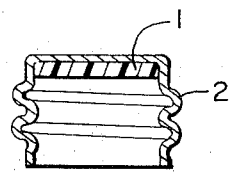
FIG. 3 shows in cross section, a gasket 1 of the above-mentioned type positioned in a bottle cap 2.

In preferred embodiments of the invention described in the above summary this invention is directed to:

(1) A thermoplastic composition consisting essentially of an intimate mixture of the composition of said summary and particulate $TiO_2$ pigment, the weight ratio of the composition of said summary to the $TiO_2$ pigment being 1:0.01–0.03.

(2) A thermoplastic sheet having a thickness of 0.01–0.03 inch and consisting essentially of the composition of said summary.

(3) A thermoplastic sheet having a thickness of 0.01–0.03 inch and consisting essentially of the composition of preferred embodiment No. (1), supra.

(4) The thermoplastic composition of the above summary or preferred embodiment No. (1) supra, in which the center segments of the block copolymer are polybutadiene.

(5) The thermoplastic composition of the above summary or preferred embodiment No. (1) supra, in which the center segments of the block copolymer are polyisoprene.

In other preferred embodiments this invention is directed to:

(6) A thermoplastic gasket having a thickness of 0.01–0.03 inch and consisting essentially of the composition of the above summary or of preferred embodiment No. (1), supra.

(7) Said thermoplastic gasket in which the center segments of the block copolymer are polybutadiene.

(8) Said thermoplastic gasket in which the center segments of the block copolymer are polyisoprene.

DETAILED DESCRIPTION OF THE INVENTION

Since the composition of this invention will be used in bottle caps for capping bottles containing alcoholic beverages for human consumption, the titanium dioxide pigment, the 2,6-ditert-butyl para-cresol, the wax, and the oil used in preparing the composition must be approved by the FDA for such use.

The instant invention will be better understood by referring to the following specific but nonlimiting examples. It is understood that said invention is not limited by these examples which are offered merely as illustrations; it is also understood that modifications can be

Example 1

A mixture (designated "Mixture 1") useful for preparing gaskets for caps of bottles for capping alcoholic beverages (e.g., cordials, brandies, whiskeys, rums including high proof rums, vodkas, gins, and the like) was prepared by admixing at 300–350° F. in a heavy duty (Banbury) mixer for about 10 minutes (i.e., until a uniform mixture resulted) 85 parts of Kraton 1102, 8 parts of a completely saturated paraffinic wax melting at 124° F., 4 parts of a completely saturated petroleum oil having a density of 0.86 g. per cc. at 60° F., a viscosity of about 35 cps., and a naphthenic content of about 35%, 2 parts of particulate titanium dioxide pigment passing a 200 mesh (US standard) screen with 99.5% of the titanium dioxide particles having a particle size smaller than 44 microns, and 1 part of 2,6-ditert-butyl paracresol. (Kraton 1102 is a block copolymer of styrene and butadiene having polystyrene end segments (or blocks) and polybutadiene center segments (or blocks), the center segments constituting about 55% of said block copolymer, said copolymer having a molecular weight of about 90,000, said Kraton 1102 was obtained from the Polymer Division of Shell Chemical Company.)

Example 2

Run 2A: Mixture 1, exit the Banbury mixer was transferred without substantial cooling to an extruder. (In this instance, an extruder of the type used to extrude a polyvinyl chloride sheet; however, any heated extruder adapted for heavy duty and adjustable to extrude a sheet or tape having a thickness of about 25 mils can be used with excelent results.) In this run friction produced by rotating the extruder's screw generated sufficient heat to maintain the mixture within the extruder at a workable temperature. The mass of Mixture 1 in the extruder was held at 250–350° F. while extruding said Mixture 1 therefrom as a sheet having a thickness of about 25 mils. This sheet was designated "Product 2A." The extruded sheet of Product 2A was supported on a support until it cooled to room temperature (in this instance about 25° C.) and after cooling was dusted with an anti-blocking agent (in this instance finely divided talc), to prevent "blocking" or sticking when rolled into rolls. Other anti-blocking agents such as finely divided clay, mica, and the like have also been used with excellent results. (If desired, gaskets can be cut from the sheet of product before it is rolled and before it is dusted with antiblocking agent.)

Run 2B: The general procedure of Run 2A was repeated; however, in this instance the material exit the Banbury mixer was poured to form a thin layer (e.g., a layer having a thickness of about 0.1–0.25 inch, cooled, chopped into pieces having a maximum dimension (length, breadth, or depth) of about 0.25 inch and fed into a heated extruder operated at about 275–325° C. and extruded as a sheet having a thickness of about 25 mils. This sheet was designated "Product 2B."

Example 3

The general procedure of Example 1 was repeated. However, in this instance the titanium dioxide pigment was omitted. The produce was designated "Mixture 3."

Example 4

The general procedure of Run 2A of Example 2 was repeated. However, in this instance the procedure was modified by replacing the Mixture 1 used in said Run 2A with Mixture 3, described supra. Product exit the extruder (a thermoplastic sheet having a thickness of about 25 mils) was designated "Product 4."

Example 5

Run 5A: The general procedure of Example 1 was repeated. However, in this instance the procedure was modified by replacing the Kraton 1102 with Kraton 1101 (another of Shell Chemical Company's styrene-butadiene block copolymers having polybutadiene center segments (or blocks) and polystyrene end segments (or blocks), the center segments constituting about 50% of said block copolymer, said block copolymer having a molecular weight of about 100,000. In this instance the Banbury mixer was replaced with a sigma blade mixer. Product exit the mixer was designated "Mixture 5."

Example 6

The general procedure of Run 2A of Example 2 was repeated. However, in this instance the procedure was modified by replacing the Mixture 1 used in said Run 2 with the above-described Mixture 5. Product exit the extruder (a thermoplastic sheet having a thickness of about 25 mils) was designated "Product 6."

Example 7

The general procedure of Example 1 was repeated. However, in this instance the Kraton 1102 was replaced with Kraton 1107. Said Kraton 1107 was also obtained from Shell Chemical Company. Kraton 1107 is a block copolymer of styrene and isoprene having polyisoprene center segments (or blocks) and polystyrene end segments (or blocks), the center segments constituting about 55% of said block copolymer, said block copolymer having a molecular weight of about 80,000. Product exit the mixer was designated "Mixture 7."

Example 8

The general procedure of Run 2A of Example 2 was repeated. However, in this instance the procedure was modified by replacing Mixture 1 used in Run 2A with Mixture 7, described supra. Product exit the extruder (a thermoplastic sheet having a thickness of about 25 mils) was designated "Product 8."

Example 9

The general procedure of Example 1 was repeated. However, in this instance the procedure was modified by replacing the paraffinic wax with a polyethylene wax having a molecular weight of about 1000 and melting at about 235° F. Product exit the mixer was designated "Mixture 9."

Example 10

The general procedure of Run 2A of Example II was repeated. However, in this instance, the procedure was modified by replacing the Mixture 1 used in said Run 2A with the above-described Mixture 9. Product exit the extruder (a thermoplastic sheet having a thickness of about 25 mils) was designated "Product 10."

Example 11

Run 11A: Gaskets fitting aluminum bottle caps, said caps fitting one-pint test bottles, were cut from Product 2A, inserted and seated in 1,000 of said caps, said caps having been preheated to 250° F. (the softening point of Product 2). One gasket was placed in each cap. Said preheated bottle caps were kept at 250° F. while inserting and seating the gaskets by supporting the gaskets on a heated surface during the inserting and seating operation. After the gaskets were seated the caps were cooled to room temperature (ca. 25° C.). The thus cooled bottle caps with gaskets seated therein were designated "Caps 11A."

Run 11B through 11F: Five runs were made using the general procedure of Run 11A except that Products 2B, 4, 6, 8, and 10, respectively, were substituted, as set forth in Table I, below, for Product 2A. The designation assigned the cooled bottle caps prepared in these runs is also set forth in said table.

TABLE I

| Run number | Product used to perpare gaskets | Designation assigned to cooled bottle caps with gaskets |
|---|---|---|
| 11B | 2B | Caps 11B. |
| 11C | 4 | Caps 11C. |
| 11D | 6 | Caps 11D. |
| 11E | 8 | Caps 11E. |
| 11F | 10 | Caps 11F. |

Example 12

The following alcoholic beverages were used in the runs reported in this example:

TABLE II

| High alcoholic content beverage (liquor): | Designation assigned to the alcoholic beverage |
|---|---|
| 49 Proof liqueur | Beverage 1. |
| 60 Proof liqueur | Beverage 2. |
| 86 Proof liqueur | Beverage 3. |
| 100 Proof liqueur | Beverage 4. |
| 80 Proof rum | Beverage 5. |
| 151 Proof rum | Beverage 6. |
| 80 Proof blended whiskey | Beverage 7. |
| 86 Proof blended whiskey | Beverage 8. |
| 90 Proof blended whiskey | Beverage 9. |
| 90 Proof straight whiskey | Beverage 10. |
| 100 Proof bonded whiskey | Beverage 11. |
| 101 Proof straight whiskey | Beverage 12. |
| 80 Proof vodka | Beverage 13. |
| 100 Proof vodka | Beverage 14. |
| 55 Proof Manhattan cocktail | Beverage 15. |
| 67.5 Proof dry martini cocktail | Beverage 16. |
| 53 Proof cordial | Beverage 17. |
| 54 Proof cordial | Beverage 18. |
| 70 Proof cordial | Beverage 19. |
| 60 Proof rock and rye | Beverage 20. |

Run 12A: Three one-pint test bottles were filled with Beverage No. 1, three with Beverage No. 2, three with Beverage No. 3, three with Beverage No. 4, and so on until sixty one-pint bottles had been filled—three bottles with each beverage listed in Table II, supra. In each instance the beverage was taken from a bottle of commercially available liquor purchased at a liquor store and transferred to the test bottle. Also three bottles of the commercially available liquor were, in each instance, saved as controls and stored at about 23-26° C.

Each of the above-described filled test bottles was capped with a cap selected from the aforesaid Caps 11A and stored at room temperature (ca. 23-26° C.).

After storage for one month one test bottle containing each of the above-mentioned beverages was opened, examined, smelled, and tasted—comparing the appearance, odor, and taste with that of a freshly opened control bottle of the same liquor. In each instance, the liquor in the test bottle was clear, free of turbidity, and free of objectionable odor. In each instance the taste and odor of liquor from the test bottle was indistinguishable from that of the same liquor from a freshly opened control.

After storage for three months a second test bottle of each liquor and another control bottle of each liquor were opened and examined as above. In each instance the liquor from the test bottle was comparable to and could not be distinguished, on the basis of appearance, taste, and odor, from the same liquor from a freshly opened control bottle (a bottle packaged, capped and sealed by the liquor's manufacturer or distributor).

After storage for 10 months the third test bottle and the third control bottle of each liquor were opened and compared. In each instance the liquor from the test bottle was comparable to and could not be distinguished on the basis of appearance, taste, and odor from the same liquor from a freshly opened control bottle.

Runs 12B through 12F: Five runs were made using the general procedure of Run 12A except that Caps 11B, 11C, 11D, 11E, and 11F were substituted, as set forth in Table III, below for Caps 11A.

TABLE III

| Run No.: | Caps used in run |
|---|---|
| 12B | Caps 11B. |
| 12C | Caps 11C. |
| 12D | Caps 11D. |
| 12E | Caps 11E. |
| 12F | Caps 11F. |

In no instances in any of the runs set forth in Table III, supra, could a liquor from a test bottle be distinguished by appearance, taste, and odor from a control bottle of the same liquor after standing for one month, three months, or 10 months.

As used herein, the term "percent (%)" means parts per hundred by weight unless otherwise defined where used.

As used herein the term "parts" means parts by weight unless otherwise defined where used.

All ditert-butyl para-cresol and all titanium dioxide used in preparing the compositions of this invention were of a grade approved by the FDA for use in making gaskets for caps for bottles used to contain alcoholic beverages for human consumption.

As used herein the term "cc." means cubic centimeter (or cubic centimeters).

As used herein the term "g." means gram (or grams).

As used herein, the term "cps." means centipoises measured at 70° F. unless otherwise defined where used.

As used herein the term "mil" means 0.001 inch; thus, 10 mils is 0.01 inch and 100 mils is 0.1 inch.

We claim:

1. A thermoplastic gasket adapted to fit a cap for an alcoholic liquor bottle consisting essentially of an intimate mixture of:
   (a) 70–90 parts of a block copolymer having a molecular weight of 75,000-120,000 and consisting essentially of 30–60% polystyrene end segments and 70–40% center segments selected from the group consisting of polybutadiene or polyisoprene, the end segments plus center segments totalling 100%;
   (b) 3–15 parts of a completely saturated petroleum oil having a density of 0.85–0.88 g. per cc. at 60° F., a viscosity of 25–60 cps., and a naphthenic content of less than 40%;
   (c) 6–15 parts of a completely saturated paraffinic wax melting between 105 and 150° F.; and
   (d) 1–3 parts of 2,6-ditert-butyl para-cresol.

2. The thermoplastic gasket of claim 1, said gasket having a thickness of 0.01–0.03 inch.

3. The thermoplastic gasket of claim 2 in which the center segments of the block copolymer are polybutadiene.

4. The thermoplastic gasket of claim 2 in which the center segments of the block copolymer are polyisoprene.

5. The gasket of claim 1 in which said gasket consists essentially of an intimate mixture of:
   (a) 70–90 parts of a block copolymer having a molecular weight of 75,000–120,000 and consisting essentially of 30–60% polystyrene end segments and 70–40% center segments selected from the group consisting of polybutadiene or polyisoprene, the end segments plus center segments totalling 100%;
   (b) 3–15 parts of a completely saturated petroleum oil having a density of 0.85–0.88 g. per cc. at 60° F., a viscosity of 25–60 cps., and a naphthenic content of less than 40%;
   (c) 6–15 parts of a completely saturated paraffinic wax melting between 105 and 150° F.;

(d) 1–3 parts of 2,6-ditert-butyl para-cresol; and (e) particulate TiO₂ pigment, the weight ratio of; (i) the block copolymer; plus (ii) the completely saturated petroleum oil; plus (iii) the completely saturated paraffinic wax; plus (iv) the 2,6-ditert-butyl para-cresol to the particulate TiO₂ pigment being 1:0.01–0.03.

6. A thermoplastic composition consisting esentially of an intimate mixture of:

(a) 70–90 parts of a block copolymer having a molecular weight of 75,000–120,000 and consisting essentially of 30–60% polystyrene end segments and 70–40% center segments selected from the group consisting of polybutadiene or polyisoprene, the end segments plus center segments totalling 100%;

(b) 3–15 parts of a completely saturated petroleum oil having a density of 0.85–0.88 g. per cc. at 60° F., a viscosity of 25–60 cps., and a naphthenic content of less than 40%;

(c) 6–15 parts of a polyethylene wax having a molecular weight of about 1,000 and melting at about 235° F.; and (d) 1–3 parts of 2,6-ditert-butyl para-cresol.

7. A thermoplastic composition consisting essentially of an intimate mixture of the composition of claim 6 and particulate TiO₂ pigment, the weight ratio of the composition of claim 6 to the TiO₂ pigment being 1:0.01–0.03.

8. A thermoplastic sheet having a thickness of 0.01–0.03 inch and consisting essentially of the thermoplastic composition of claim 7.

9. The thermoplastic composition of claim 7 in which the center segments of the block copolymer are polybutadiene.

10. The thermoplastic composition of claim 7 in which the center segments of the block copolymer are polyisoprene.

11. A thermoplastic gasket having a thickness of 0.01–0.03 inch and consisting essentially of the composition of claim 7 said gasket being adapted to fit a cap for an alcoholic liquor bottle.

12. The thermoplastic gasket of claim 11 in which the center segments of the block copolymer are polybutadiene.

13. The thermoplastic gasket of claim 11 in which the center segments of the block copolymer are polyisoprene.

14. A thermoplastic sheet having a thickness of 0.01–0.03 inch and consisting essentially of the thermoplastic composition of claim 6.

15. The thermoplastic composition of claim 6 in which the center segments of the block copolymer are polyisoprene.

16. The thermoplastic composition of claim 6 in which the center segments of the block copolymer are polybutadiene.

17. A thermoplastic gasket having a thickness of 0.01–0.03 inch and consisting essentially of the composition of claim 6, said gasket being adapted to fit a cap for an alcoholic liquor bottle.

18. The thermoplastic gasket of claim 17 in which the center segments of the block copolymer are polybutadiene.

19. The thermoplastic gasket of claim 17 in which the center segments of the block copolymer are polyisoprene.

References Cited

UNITED STATES PATENTS

| | | | |
|---|---|---|---|
| 3,265,765 | 8/1966 | Holden | 260—28.5 B |
| 3,496,125 | 2/1970 | Boyer | 260—28.5 B |
| 3,239,478 | 3/1966 | Harlan | 260—33.6 AQ |
| 3,459,831 | 8/1969 | Luftglass | 260—33.6 AQ |
| 3,676,386 | 7/1972 | Brenner | 260—28.5 B |

MORRIS LIEBMAN, Primary Examiner

P. R. MICHL, Assistant Examiner

U.S. Cl. X.R.

260—33.6 AQ